(12) United States Patent  
Wuergler et al.

(10) Patent No.: US 8,750,832 B2  
(45) Date of Patent: Jun. 10, 2014

(54) CONNECTING A PERSONAL MOBILE DEVICE TO A VEHICLE COMMUNICATION UNIT

(75) Inventors: Michael A. Wuergler, Clarkston, MI (US); Steven C. Tengler, Grosse Pointe Park, MI (US); Robert A. Hrabak, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/561,425

(22) Filed: Jul. 30, 2012

(65) Prior Publication Data

US 2014/0031010 A1 Jan. 30, 2014

(51) Int. Cl.
*H04M 1/66* (2006.01)
*H04M 1/68* (2006.01)

(52) U.S. Cl.
USPC ............. 455/411; 455/575.9; 455/569.2; 455/41.1; 455/41.2; 455/502; 455/557; 455/556.1; 455/569.1

(58) Field of Classification Search
USPC ......... 455/575.9, 569.2, 41.1, 41.2, 502, 557, 455/556.1, 569.1
See application file for complete search history.

(56) References Cited

U.S. PATENT DOCUMENTS

| | | | |
|---|---|---|---|
| 2004/0219954 A1* | 11/2004 | Odinak | 455/569.1 |
| 2006/0178169 A1* | 8/2006 | Dunn et al. | 455/569.2 |
| 2007/0238491 A1* | 10/2007 | He | 455/569.2 |
| 2011/0143750 A1* | 6/2011 | Farrell et al. | 455/426.1 |

* cited by examiner

*Primary Examiner* — Kwasi Karikari
(74) *Attorney, Agent, or Firm* — Anthony Luke Simon; Reising Ethington P.C.

(57) ABSTRACT

A method and apparatus for connecting a personal mobile device to a vehicle communication unit. The method involves automatically detecting the presence of a personal mobile device located at a vehicle, obtaining permission to connect the personal mobile device, and automatically connecting the personal mobile device to the vehicle communication unit. The method and apparatus can be used, for example, during an initial connection of a personal mobile device to a vehicle communication unit or each time a new mobile device is present in the vehicle.

9 Claims, 2 Drawing Sheets

CONNECTING A PERSONAL MOBILE DEVICE TO A VEHICLE COMMUNICATION UNIT

TECHNICAL FIELD

The present invention relates generally to vehicle communication systems and, more particularly, to techniques for connecting a personal mobile device to a vehicle communication unit.

BACKGROUND OF THE INVENTION

A vehicle occupant may initiate a connection of a personal mobile device such as a personal mobile phone to a vehicle communication unit for a variety of reasons including hands-free usage of the device in the vehicle, replicating the phone's user interface, obtaining music, data, or other content from the device, or to provide vehicle telematics services via the device. However, in some instances, the vehicle occupant may not be aware of the device connection capability of the vehicle. Or, even where the vehicle occupant is aware of the device connection capability of the vehicle, the initial connection process can be cumbersome and may require several steps including reading the vehicle operator manual, and performing several manual steps and/or oral commands by the vehicle occupant in order to connect a personal mobile device such a phone to a vehicle communication unit.

SUMMARY OF THE INVENTION

According to one embodiment of the invention, there is provided a method for connecting a personal mobile device to a vehicle communication unit, comprising the steps of: (a) detecting the presence of an occupant in a vehicle having a vehicle communication unit that communicates wirelessly via short range wireless communication; (b) determining the presence of a personal mobile device within the vehicle in response to the detection using the short range wireless communication; (c) determining a device type associated with the mobile device; (d) determining that the device type is one for which establishment of a wireless communication link between the mobile device and vehicle communication unit is potentially desired by the occupant; (e) presenting to the occupant in the vehicle a prompt inquiring whether the communication link is desired; (f) receiving from the occupant an indication that the communication link is desired; and (g) establishing the communication link between the mobile device and vehicle communication unit in response to the indication.

According to another embodiment of the invention, there is provided a method for connecting a personal mobile device to a vehicle communication unit, comprising the steps of: (a) in response to a vehicle trigger, monitoring for a signal indicative of a personal mobile device being located at a vehicle; (b) detecting the presence of a personal mobile device in response to the monitoring; (c) checking if an identifier associated with the personal mobile device has an associated counter indicating that a connection to the personal mobile device had been rejected one or more times by a user of the vehicle; (d) determining either that no said counter is present or that the counter has reached a reset value; (e) in response to the determination in step (d), requesting permission from the user of the vehicle to connect the personal mobile device to the vehicle communication unit; (f) obtaining permission to connect the personal mobile device; and thereafter (g) establishing short range wireless communication between the personal mobile device and the vehicle communication unit.

According to another embodiment of the invention, there is provided an apparatus for wirelessly connecting to a personal mobile device in a vehicle, wherein the apparatus having a vehicle communication unit that includes a processor and computer readable memory that contains instructions that are executed by the processor to carry out the following steps: (a) detecting the presence of an occupant in a vehicle having a vehicle communication unit that communicates wirelessly via short range wireless communication; (b) determining the presence of a personal mobile device within the vehicle in response to the detection using the short range wireless communication; (c) determining a device type associated with the mobile device; (d) determining that the device type is one for which establishment of a wireless communication link between the mobile device and vehicle communication unit is potentially desired by the occupant; (e) presenting to the occupant in the vehicle a prompt inquiring whether the communication link is desired; (f) receiving from the occupant an indication that the communication link is desired; and (g) establishing the communication link between the mobile device and vehicle communication unit in response to the indication; wherein at least steps (b) through (e) are carried out automatically by the apparatus without manual initiation by the occupant.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE ILLUSTRATED EMBODIMENT(S)

The method and apparatus described below may be used with a vehicle communications system. They provide some techniques that can be used to automatically connect a personal mobile device in a manner that is relatively easy to carry out by a user of the vehicle. For instance, as it will be described in more detail below, in one embodiment, the method and apparatus automatically searches for personal mobile devices, selects a specific personal mobile device and then prompts the user to approve or disapprove connecting this specific personal mobile device. This routine may be repeated for other devices until one or more personal mobile devices are connected to the vehicle communication unit or all detected devices have been rejected by the user of the vehicle. In carrying out this process, the system can ignore detected devices that are not of the type for which connection to the vehicle is desired or helpful; for example, wireless headsets carried by the occupant for use with his or her mobile phone.

Communications System—

Figure 1:
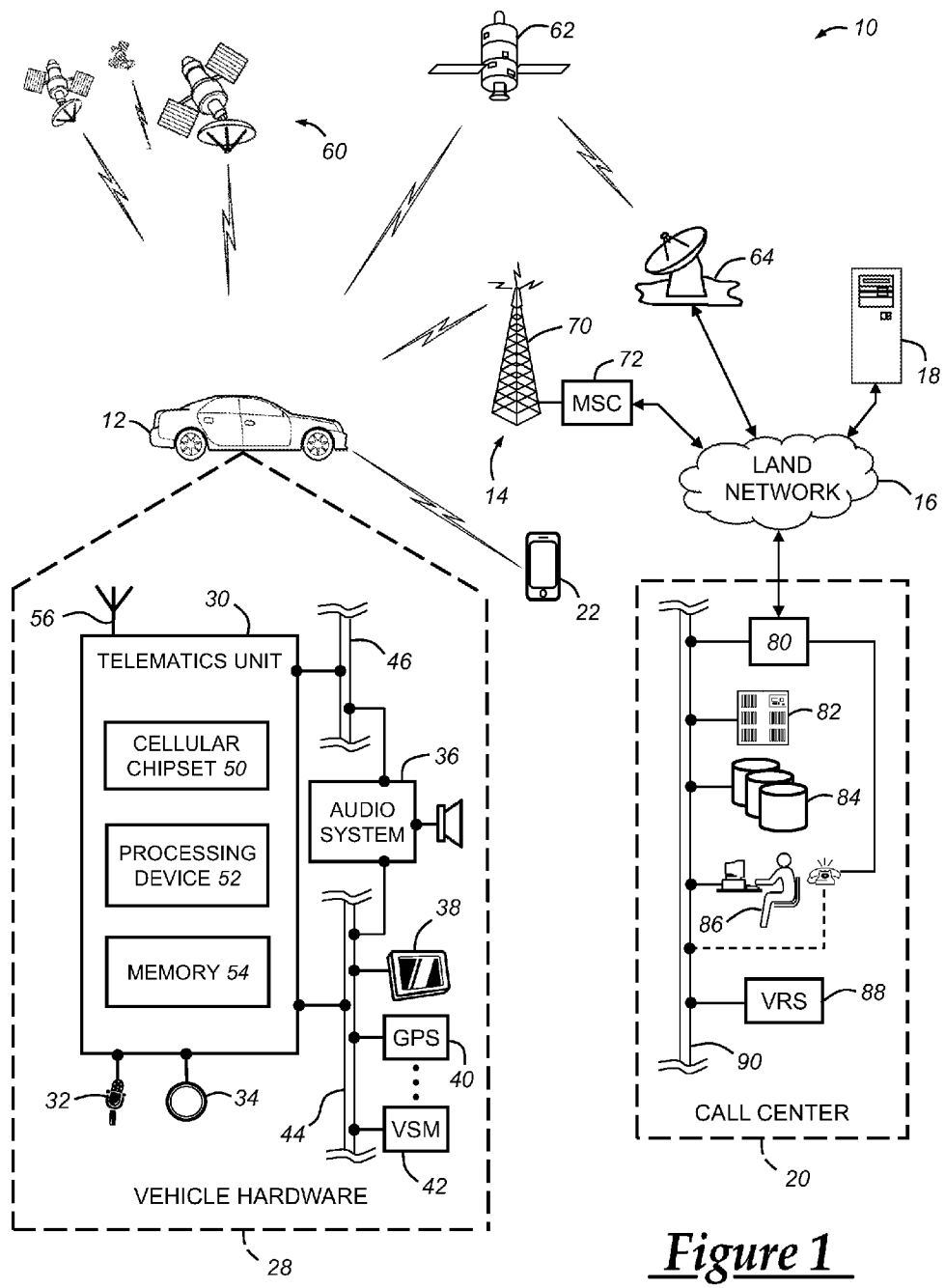
FIG. 1 is a block diagram depicting an exemplary embodiment of a communications system that is capable of utilizing the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth™. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs, DSRC, etc.), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Apart from computer 18, other types of remotely located processing devices can be used. For example, a mobile communication device 22 can be used and can be one of a number of such communication devices used by subscribers. Each mobile device 22 is a processing device that can be used for one or more purposes, such as voice communication, text messaging, email, web browsing, gaming, camera, video recording, sending and receiving photos and videos, audio player (e.g., MP3), radio, GPS navigation, personal organizer, to name but a few. In the illustrated embodiment, mobile device 22 is a mobile phone such as a cell phone that connects to a cellular network such as system 14. In another embodiment, mobile device 22 can be a personal digital assistant (PDA) that has wireless communication ability, but may or may not be equipped to provide telephony services itself. Mobile device 22 communicates wirelessly with the vehicle 12 by any suitable technology; for example, via a Bluetooth™ connection between the mobile device 22 and telematics unit 30. Other than mobile phones and PDAs, various other types of suitable processing devices can be used as the mobile device 22.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Method—

Figure 2:
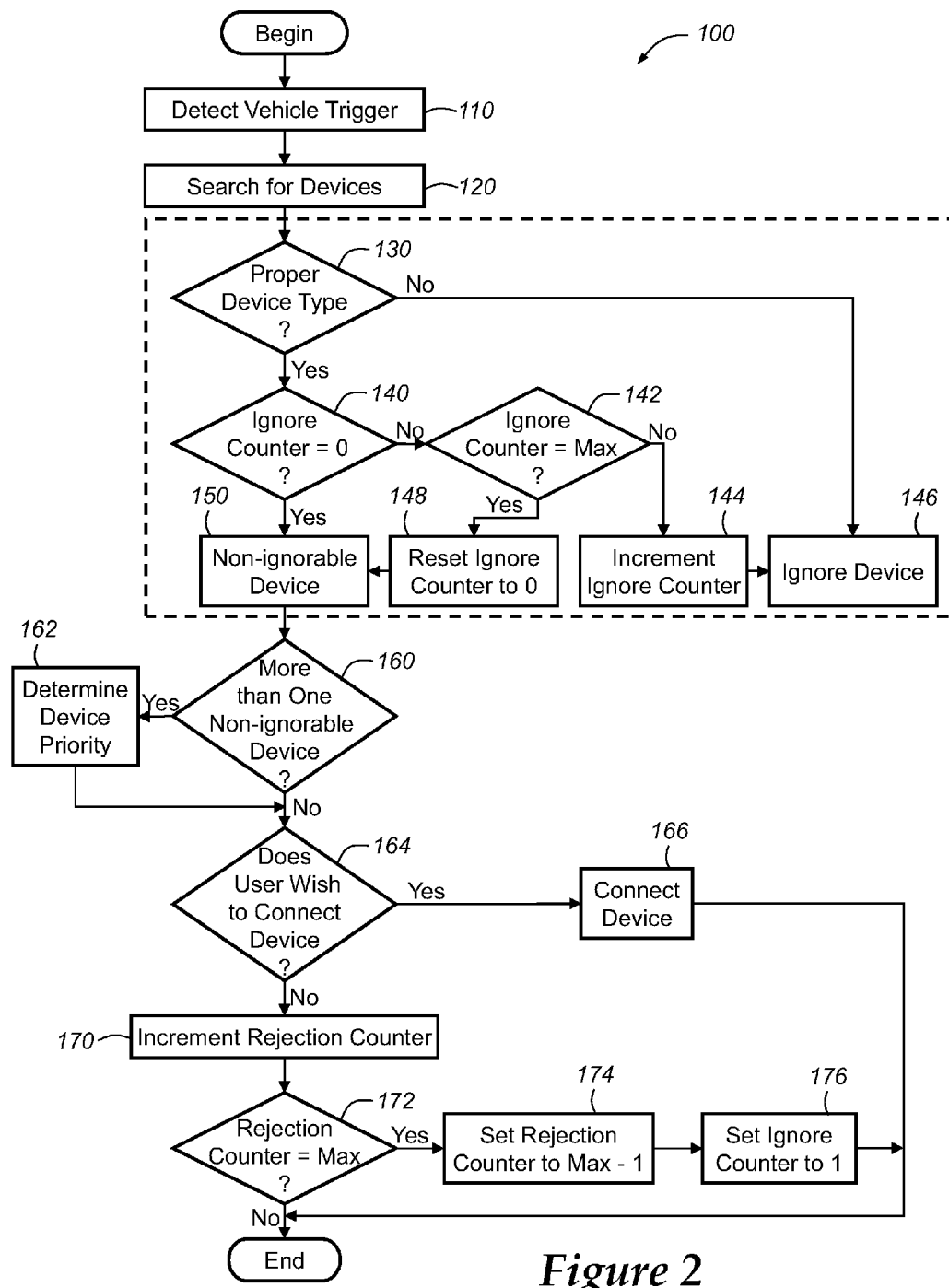
FIG. 2 is a flowchart showing some steps of an exemplary method that may be used with a communications system, such as the one illustrated in FIG. 1.

Turning now to FIG. 2, there is shown a method 100 for connecting a personal mobile device such as mobile phone 22 to a vehicle communication unit such as telematics unit 30. In some embodiments, the vehicle communication unit can include wireless cellular or other communication capability, such as using cellular chipset 55; in other embodiments, the vehicle communication unit may only be capable of short range wireless communication such as via Bluetooth™. The method starts at step 110 and begins by determining if a vehicle trigger has occurred. The vehicle trigger can be, for example, any trigger that is indicative of the operation of vehicle 12 including use of keyless entry system (e.g. remote keyless entry system, smart key, etc.), turning ignition on via any suitable method (e.g., remote keyless ignition (RKI) system, ignition push button, ignition key, etc.), and/or performing any other vehicle function (e.g., turn audio system on, turn navigation system on, open/close a window, etc.). However, in other embodiments, the trigger may also or instead be a trigger that determines the presence of an occupant in vehicle 12 via any suitable technique including use of a weight sensor, an occupant position sensor, a seat belt sensor, vision sensor, heartbeat sensor, etc. It is also possible to detect the absence or presence of the vehicle occupant based on the movement or manipulation of seats and/or switches located inside a vehicle. For instance, if the driver's seat of the vehicle is adjusted, this act can be sensed via a device such as the VSM 42. And while detecting the movement/manipulation of the seats/switches can indicate the absence/presence of a vehicle occupant, this can also be used to identify the location of the vehicle occupant within the vehicle. That is, if the driver's seat of the vehicle is adjusted or switches reachable to the driver are operated (e.g., the driver side window or the vehicle ignition switch), then it can be determined that the driver is present. Similarly, if the passenger seat is adjusted or switches reachable to the passenger are operated (e.g., the passenger-side window), then it can be determined that a vehicle occupant is present in the passenger seat of the vehicle. However implemented, a primary purpose of this trigger is to determine the arrival or presence of an occupant at the vehicle so that the method may then check to determine if any devices are present for which a short range wireless connection may be devised. If the trigger occurs then method 100 proceeds to the next block shown in FIG. 2.

At step 120, method 100 searches or monitors for any personal mobile devices. At this step, method 100 may monitor for any personal mobile devices for a specific time duration, until one or more devices are found, or until occurrence of one or more other conditions such as driving a predetermined distance or reaching a predetermined speed. In one embodiment, in response to the occurrence of the vehicle trigger of step 110, method 100 may monitor for a broadcast signal from the personal mobile device 22 and thereafter determine that a mobile device is present in response to receipt of the broadcast signal. Other suitable techniques for monitoring for a mobile device may be used, such as by sending out an interrogating signal, as will be known to those skilled in the art.

At step 130, method 100 checks if one or more found devices are of appropriate type for connecting to the vehicle communication unit. A variety of devices can be equipped with short range wireless communication; these devices may include toys, computer related devices (e.g., mouse, keyboard, etc.), wireless headsets, medical devices, etc. that may not be suitable and/or desirable for communication with a vehicle communication unit. Method 100 may filter the one or more found mobile devices via one or more device codes received from the one or more mobile device through a short range wireless communication and method 100 can then determine if the device code identifies the mobile device as being an appropriate type of device. In one embodiment, communication unit 30 determines if one or more Bluetooth™ devices are appropriate (e.g., by device type) via a Bluetooth™ code including device address, device class, etc. In one embodiment, communication unit 30 may recognize via a device class identifier that the personal mobile device is an appropriate mobile phone device by comparing the identifier to a list of identifiers stored in memory 54, for example, and method 100 proceeds to the next step. However, in case the found device is not appropriate then method 100 ignores that specific device (step 146). The devices that can be ignored can be classified in two categories: a category of devices that are not suitable for communication (e.g., toys, computer related devices, headsets, etc.) with a vehicle communication unit (e.g., telematics unit 30) and a category of devices (e.g., mobile phones) for which wireless connection to the vehicle may be desirable.

If a proper type of wireless device is detected, then the next step is to determine if it is one for which the operator wishes to have wirelessly connected to the vehicle. This process begins at step 140 and, in the illustrated embodiment, employs various counters to improve the user experience by avoiding repetitious requests for connecting to a mobile device for which the user has previously already rejected. Thus, for example, where a child has a mobile phone or other device and frequently travels in the parents' car, the counters described below may be used to permit the vehicle to initially request connection to the child's phone one or more times, and then inhibit further requests if the user consistently rejects the request. The first of these counters is an ignore counter that is used when the vehicle operator has rejected a particular mobile device one or more times to prevent continual re-requests each time the vehicle is started. Initially, the counter is reset and then following repeated rejections by the vehicle user, the ignore counter is incremented and thereafter used to ignore the device when detected, but is incremented each time until a selected maximum is reached, after which the ignore counter is reset and again permits the vehicle to request connection to the device. In this way, after rejecting a particular device one or more times, the vehicle user will not be further asked about the device until sometime later (perhaps weeks later) after the device has been ignored many times. This permits the vehicle user a later opportunity to connect the device in the event the user changes his or her mind since the original request(s).

Thus, at step 140, method 100 checks to determine if an ignore counter exists for the detected wireless device and, if so, whether it is at a reset value (e.g., zero or some other initial value). The first time a particular wireless device is detected, there will be no associated counters for that device, so that one may be initialized (e.g., in memory 54). Thus, in at least some embodiments, a separate ignore counter is used for each proper, detected device that has been ignored at least once by a vehicle user. If the ignore counter is either initially created or already exists and is at its reset value, then the device is considered non-ignorable and the method proceeds to step 150. However, it is possible to implement an exception to this action. For instance, if it is determined at step 140 that two or more devices are detected, and one of those devices is either a connected device or has previously or repeatedly connected to the vehicle while the other devices are associated with initially created counters, then the method 100 can decide to treat the other devices as ignored devices. However, if the ignore counter has previously been incremented to a value above its reset value (which signifies that the device has been previously rejected) then method 100 proceeds to step 142.

At step 142, method 100 determines if the ignore counter has reached a selected maximum value. The maximum may be a predetermined value stored previously in vehicle telematics unit 30 during vehicle manufacturing or testing, or may be provided by the vehicle user. The reset value can be a large number in order to minimize any inconvenience to the user by not asking him or her the same request over and over again. If the ignore counter value did not reach the maximum value then the ignore counter value is incremented (step 144) and later the device is ignored (step 146). However, if the maximum count is reached then the ignore counter value is reset (step 148) and the device is considered as a non-ignorable device (step 150) and it is made available again to the user. One purpose of this technique is to make available a device that was previously rejected by the user thereby inquiring whether this status has changed. As a result, the method can ask the user if he or she now wishes to connect this device to the vehicle. An example will be a user who carries more than a one mobile device and whose preference concerning which mobile device to use has changed. Or in the parent/child example above, it may be later decided to permit the child to connect his or her phone to the vehicle for playing of music, etc.

Method 100 provides one embodiment where the ignore counter is a synchronous counter that increments by one each cycle. However, other type of counters can be used, for instance, a time or date counter which holds a time period (e.g., number of hours, days, weeks, etc.) can be employed instead. In this embodiment, the time counter can be reset once it reaches a predetermined time period (e.g., 30 days, 60 days, etc.). These types of counters and the implementation of such counters will be understood by those skilled in the art. Other embodiments are also possible, for instance, a device can be ignored indefinitely if it is not desired by the user of vehicle 12.

Skilled artisans should appreciate that steps 130-150 can be performed repeatedly if more than one device is present until all the found devices, as described in previous steps, are processed.

Next, at step 160, method 100 checks to determine if more than one non-ignorable device is present. If so, then method 100 proceeds to step 162; however, if only one device is present then method 100 proceeds to step 164. At step 162, method 100 determines which device to connect. In one embodiment, method 100 automatically selects one device based on one or more criterion, or identifies for the user all of the devices available. In another embodiment, method 100 makes a priority list of the non-ignorable devices found in the vehicle so the highest priority option may be presented to the vehicle user first. In one embodiment, a device detected at a driver side is selected first, followed by a device found at a passenger side, then a device found at a back side. This can be implemented by detecting the signal strength of each detected device at a known location in the vehicle 12 and comparing the relative signal strength of each device with respect to the known location. For instance, if the signal of each device is received at a location near the steering wheel of the vehicle, and one of the signals is stronger relative to the other detected device signals, then it can be determined that the strongest signal belongs to a device carried by the driver. It is also possible to determine the location of devices in other ways, such as GPS locations in the heading of vehicular direction or other ways known to those skilled in the art. In another embodiment, a previously determined list of identifiers identifying mobile devices (e.g., John's phone, phone number, Bluetooth™ code, etc.) is checked for one or more mobile devices identifiers present in the vehicle. Other embodiments are also possible, for example, a combination of seat position detected devices and a previously determined list can be used to determine a priority list of mobile devices. For example, method 100 may scroll through a previously determined list; however, if the mobile devices identifiers of the list do not match those presently found in the vehicle then method 100 will proceed to use a seat-based list.

At step 164, method 100 checks if the occupant in the vehicle wishes to connect the device(s). Method 100 may present the occupant a prompt inquiring whether to connect the personal mobile device to the vehicle communication unit. This inquiry may be presented in any form including any audio, visual, or combination of audio and visual form. Skilled artisans will recognize several embodiments to present this inquiry including an audio request via vehicle audio system 36, a visual request via visual display 38, etc. For example, the message may say "Do you wish to connect John's Phone?" Then, the occupant can provide a response, such as a spoken response (Yes, No, or otherwise), or via manual input such as by pressing button 34 to confirm his or her desire to have the connection made. In another embodiment, the occupant can input a connection preference via any other vehicle user interface including a touch screen visual display 38. In this embodiment, the occupant may be presented with a list of non-ignorable devices on the touchscreen and the occupant may select one. Other embodiments are also possible. If the occupant selects to connect the device then method 100 proceeds to step 166; otherwise, method 100 proceeds to step 170. However, in one embodiment, step 164 may be skipped if one of the detected mobile devices is the driver's mobile device or a device previously authorized by the driver, in which case method 100 automatically connects the device (step 166) without requesting permission from the driver.

Upon obtaining the permission to connect the personal mobile device, at step 164, method 100 establishes short range wireless communication between the personal mobile device and the vehicle communication unit. The short range wireless communication can be one of a list that includes Bluetooth™, WiFi, IEEE802.11x, etc. In one embodiment, a Bluetooth™ connection is established between mobile phone 22 and communication unit 30.

In case a rejection is provided to the connection of the personal mobile device request, at step 170, method 100 increment a second counter, referred to as a rejection counter. In one embodiment, each rejected mobile device by the user is associated with a rejection counter. As with the ignore counter, the association may be performed using one or more identifiers of the rejected mobile device. If the rejected mobile device is a newly found device that was not previously rejected then method 100 may create a new counter associated with this newly found and rejected mobile device.

Next, at step 172, method 100 checks if the rejection counter has reached its maximum value. In one embodiment, the maximum corresponds to the number of times that mobile device has been successively offered and rejected by the user of the vehicle before method 100 starts to ignore this mobile device the next time if is found to be present in the vehicle (step 146). The reset threshold should be preferably a low number (e.g., 1, 2, 3, etc.) in order not to cause an unpleasant experience to the user of the vehicle. In addition, the reset threshold can be either predetermined by the vehicle or communication unit manufacturer or selected by the user. If the rejection counter has reached the selected maximum then method 100 proceeds to the next step.

At step 174, method 100 sets the rejection counter to just one under the maximum value. One reason of this embodiment is to limit the number of requests to the user. For example, once an ignored device, that was previously rejected by the user and went through the ignore counter several cycles, becomes a non-ignorable device and available again to the user, method 100 limits the number of times a request to connect the device is provided to the user since the rejection counter reaches its maximum value or reset threshold after one rejection cycle. Skilled artisans should appreciate that other embodiments to limit the number of times a request to connect the device is provided may be employed as well. For example, after a device has been rejected by a user a selected number of times (1, 2, 3, or more), the vehicle may ask the user if they would like to have that device ignored in the future, in which case the rejection counter and, in some embodiments, even the ignore counter may not be used; for example, where the user is given some other way in which to connect a device that they previously asked to have ignored.

At step 176, method 100 sets the ignore counter associated with the mobile device to 1. This tells the method to begin ignoring the device the next time it is detected. In this way, method 100 monitors how many times a mobile device was rejected by a user using a rejection counter and later method 100 will monitor how many times or for how long this mobile device is internally ignored by the method. Steps 164 and 170-176 can be repeated for other non-ignorable devices that are determined previously until all non-ignorable devices are either rejected or one of them is authorized to be connected.

In method 100, at least steps 120-162 are carried out automatically by the vehicle without manual initiation by the occupant. In addition, in one embodiment, at least steps 110-162 are carried out at the commencement of a vehicle trip and prior to the vehicle reaching a selected speed (e.g., 1-10 mph, etc.).

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For instance, in one embodiment, at step 166 the vehicle may pair more than one device in a Bluetooth™ wireless range. Then, a GPS unit is used to confirm an appropriate device to be used such as the device that has the same heading or GPS coordinates as the vehicle. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method for connecting a personal mobile device to a vehicle communication unit, comprising the steps of:
    (a) detecting the presence of an occupant in a vehicle having a vehicle communication unit that communicates wirelessly via short range wireless communication;
    (b) determining the presence of a personal mobile device within the vehicle in response to the detection using the short range wireless communication;
    (c) determining a device type associated with the mobile device;
    (d) determining that the device type is one for which establishment of a wireless communication link between the mobile device and vehicle communication unit is potentially desired by the occupant;
    (e) presenting to the occupant in the vehicle a prompt inquiring whether the communication link is desired;
    (f) receiving from the occupant an indication that the communication link is desired; and (g) establishing the communication link between the mobile device and vehicle communication unit in response to the indication, wherein at least one iteration of steps (a) through (g) is carried out for a particular vehicle trip and wherein the method further comprises carrying out another iteration of steps (a) and (b) on a different vehicle trip involving a newly-detected mobile device in the vehicle, and thereafter:

determining either that the newly-detected mobile device is one for which authorization to establish the communication link has previously been given or that the newly-detected mobile device is one for which authorization to establish the communication link has previously been denied;

establishing the communication link between the vehicle communication unit and newly-detected mobile device without prompting any occupants if authorization has previously been given; and skipping at least steps (e) through (g) if authorization has previously been denied, wherein the skipping step further comprises determining that no prompting of occupants should be carried out based on a counter indicating the number of times the newly-detected mobile device has been detected since authorization for the newly-detected mobile device was last denied.

2. The method of claim 1, wherein step (a) further comprises electronically monitoring for a vehicle condition indicative of the presence of an occupant in the vehicle and wherein step (b) comprises monitoring for a broadcast signal from the personal mobile device in response to detecting the vehicle condition and thereafter determining that the mobile device is present in response to receipt of the broadcast signal.

3. The method of claim 1, wherein step (c) further comprises detecting a device code received from the mobile device via the short range wireless communication and wherein step (d) further comprises determining that the device code identifies the mobile device as being a mobile phone.

4. The method of claim 1, wherein the method further comprises carrying out at least steps (a) through (e) at the commencement of a vehicle trip and prior to the vehicle reaching a selected speed.

5. The method of claim 1, wherein step (b) further comprises the steps of determining that at least one other personal mobile device is present in addition to the newly-detected mobile device, determining that a particular one of the plurality of detected mobile devices is the driver's mobile device, skipping at least steps (e) and (f), and carrying out step (g) using the driver's mobile device.

6. The method of claim 1, wherein step (e) further comprises playing an audible prompt in the vehicle inquiring if the communication link should be established, and wherein step (f) further comprises receiving either a speech or manual input indicating that the communication link is desired.

7. The method of claim 1, further comprising the step of providing an in-vehicle service to the occupant following step (g).

8. The method of claim 1, wherein the short range wireless communication is a Bluetooth™ communication.

9. Apparatus for wirelessly connecting to a personal mobile device in a vehicle, wherein the apparatus having a vehicle communication unit that includes a processor and computer readable memory that contains instructions that are executed by the processor to carry out the following steps:

(a) detecting the presence of an occupant in a vehicle having a vehicle communication unit that communicates wirelessly via short range wireless communication;

(b) determining the presence of a personal mobile device within the vehicle in response to the detection using the short range wireless communication;

(c) determining a device type associated with the mobile device;

(d) determining that the device type is one for which establishment of a wireless communication link between the mobile device and vehicle communication unit is potentially desired by the occupant;

(e) presenting to the occupant in the vehicle a prompt inquiring whether the communication link is desired;

(f) receiving from the occupant an indication that the communication link is desired; and (g) establishing the communication link between the mobile device and vehicle communication unit in response to the indication;

wherein at least steps (b) through (e) are carried out automatically by the apparatus without manual initiation by the occupant, wherein at least one iteration of steps (a) through (g) is carried out for a particular vehicle trip and wherein the method further comprises carrying out another iteration of steps (a) and (b) on a different vehicle trip involving a newly-detected mobile device in the vehicle, and thereafter:

determining either that the newly-detected mobile device is one for which authorization to establish the communication link has previously been given or that the newly-detected mobile device is one for which authorization to establish the communication link has previously been denied;

establishing the communication link between the vehicle communication unit and newly-detected mobile device without prompting any occupants if authorization has previously been given; and skipping at least steps (e) through (g) if authorization has previously been denied, wherein the skipping step further comprises determining that no prompting of occupants should be carried out based on a counter indicating the number of times the newly-detected mobile device has been detected since authorization for the newly-detected mobile device was last denied.

* * * * *